Figures 1, 9:
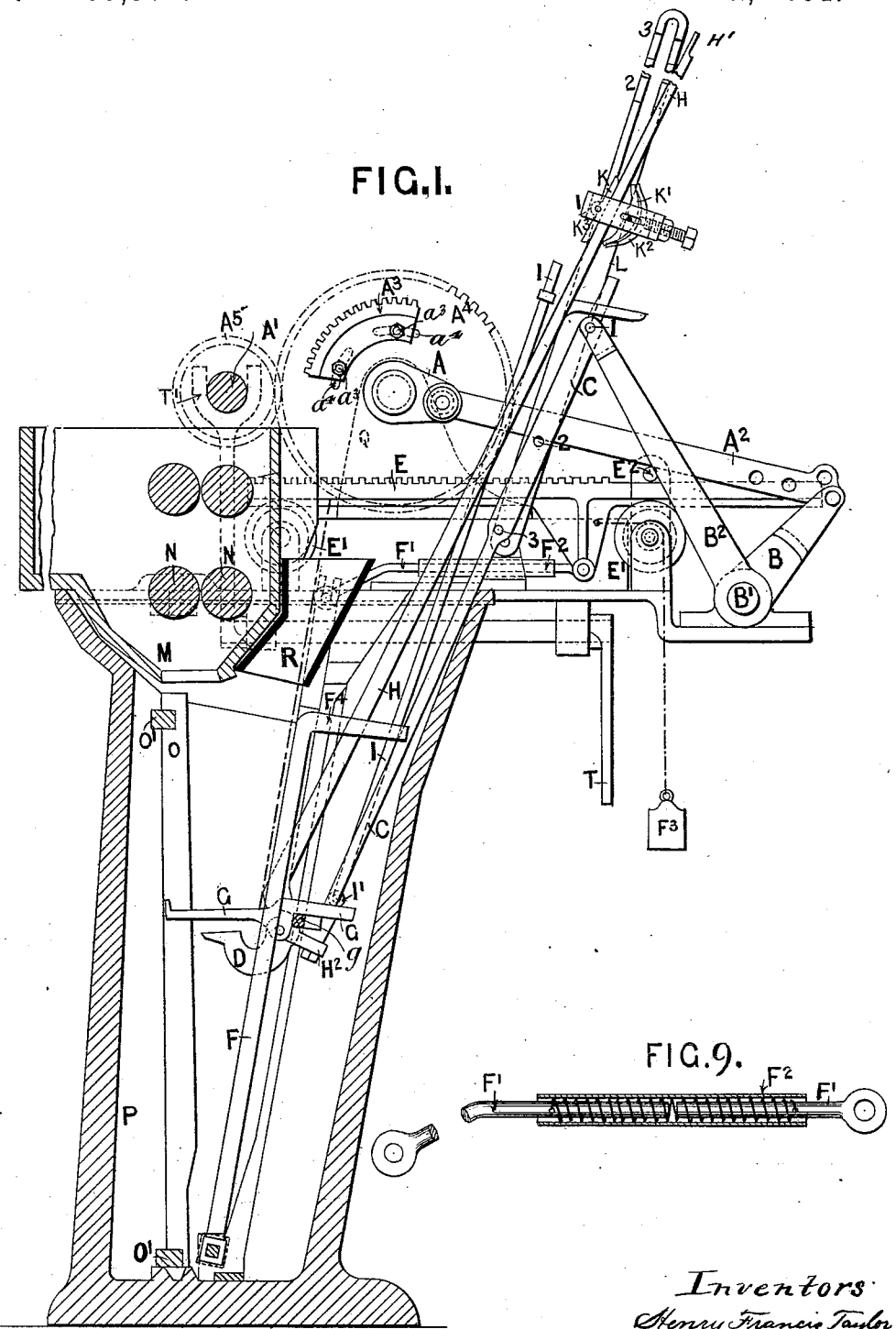

(No Model.) 5 Sheets—Sheet 1.

H. F. TAYLOR & W. P. STRUVÉ.
APPARATUS FOR TINNING PLATES.

No. 453,304. Patented June 2, 1891.

Witnesses:
Ella S. Johnson
R. H. Sommers

Inventors
Henry Francis Taylor
William Peddie Struvé
per Henry Orth Atty.

(No Model.) 5 Sheets—Sheet 2.
H. F. TAYLOR & W. P. STRUVÉ.
APPARATUS FOR TINNING PLATES.
No. 453,304. Patented June 2, 1891.
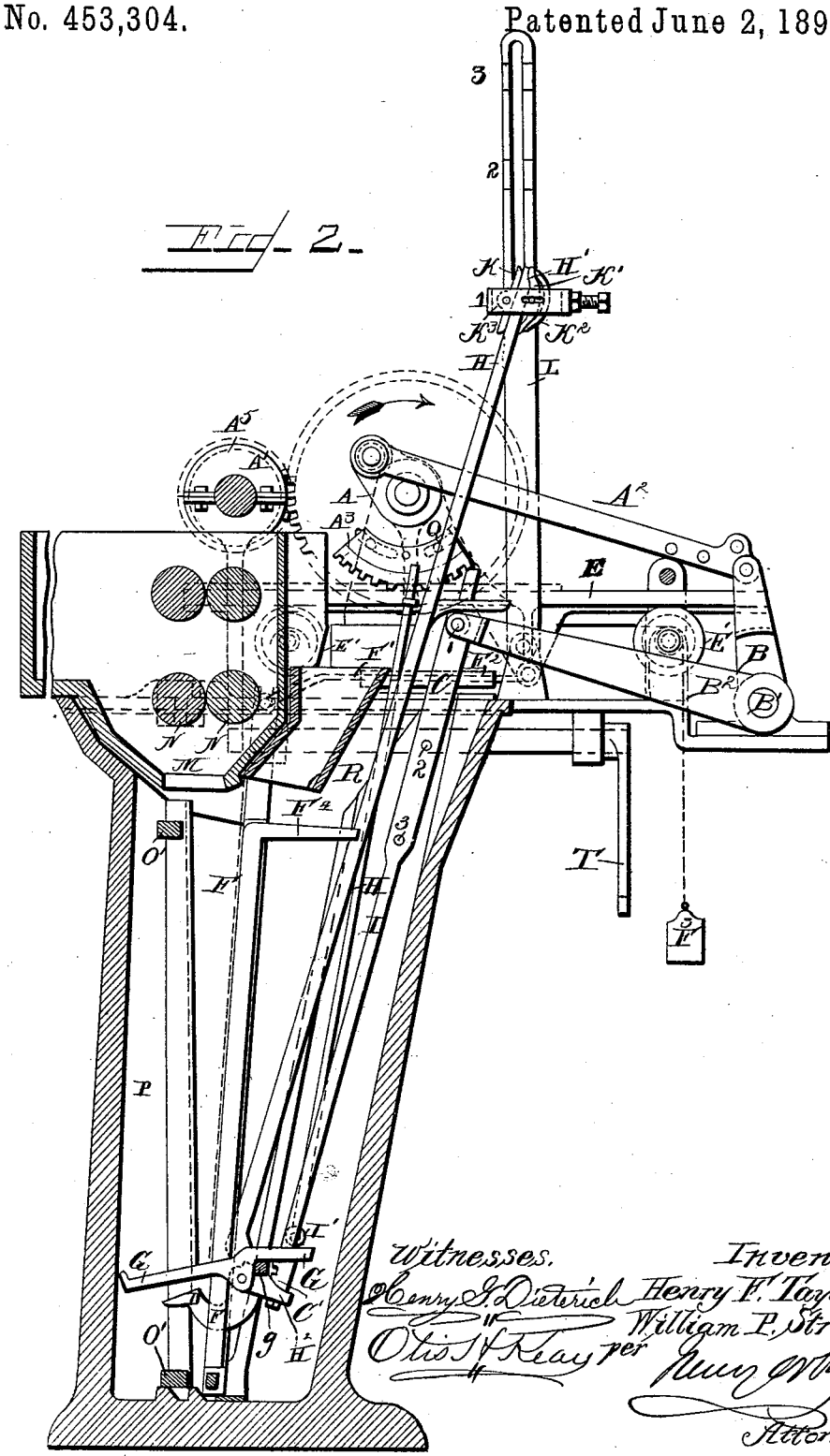

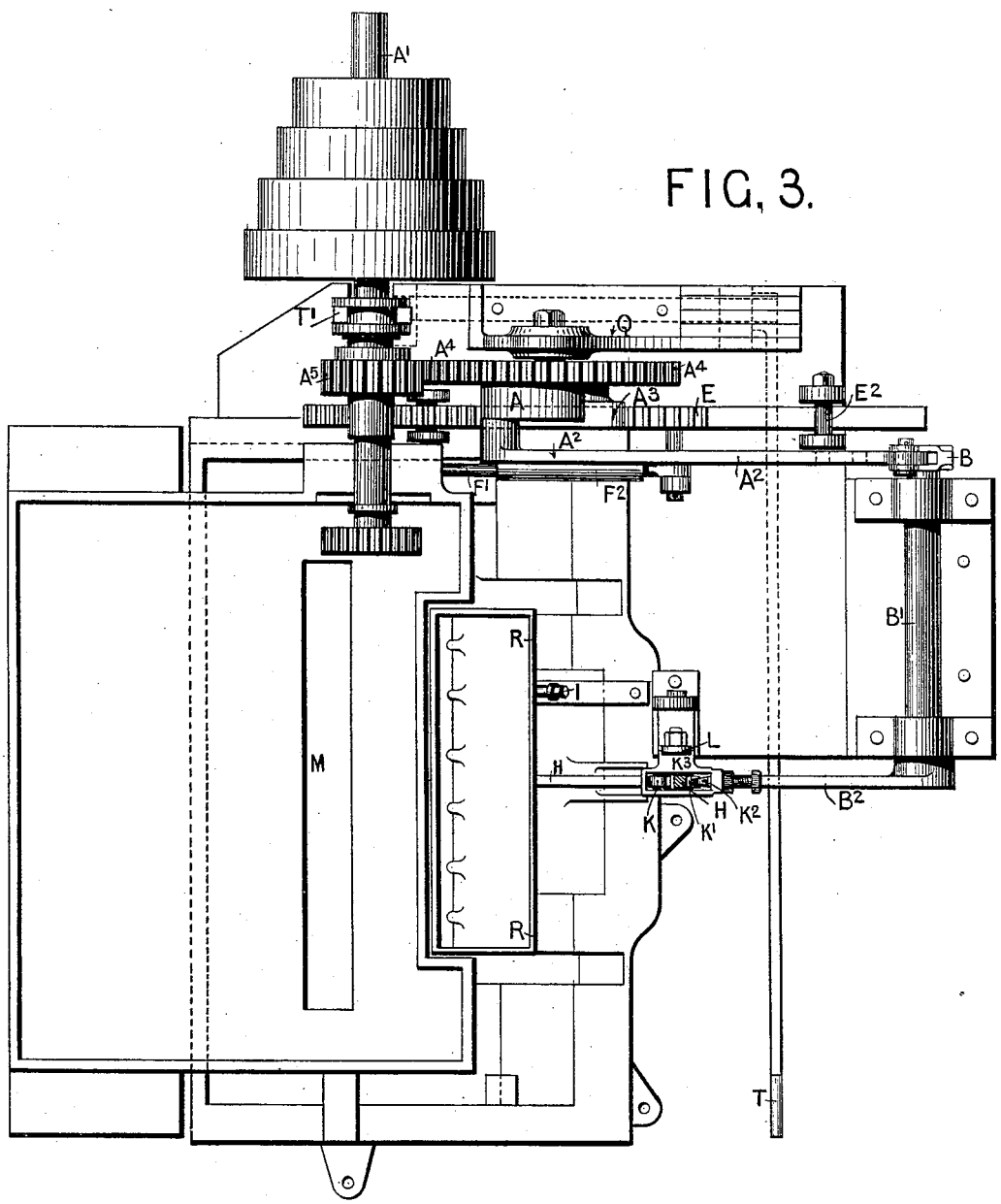

(No Model.) 5 Sheets—Sheet 4.

H. F. TAYLOR & W. P. STRUVÉ.
APPARATUS FOR TINNING PLATES.

No. 453,304. Patented June 2, 1891.

Witnesses:
Ella S. Johnson
P. W. Sommers

Inventors
Henry Francis Taylor
William Peddie Struve
Henry Orth
Atty (No Model.) 5 Sheets—Sheet 5.
H. F. TAYLOR & W. P. STRUVÉ.
APPARATUS FOR TINNING PLATES.
No. 453,304. Patented June 2, 1891.
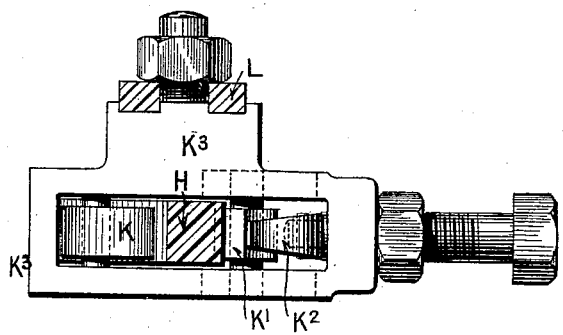
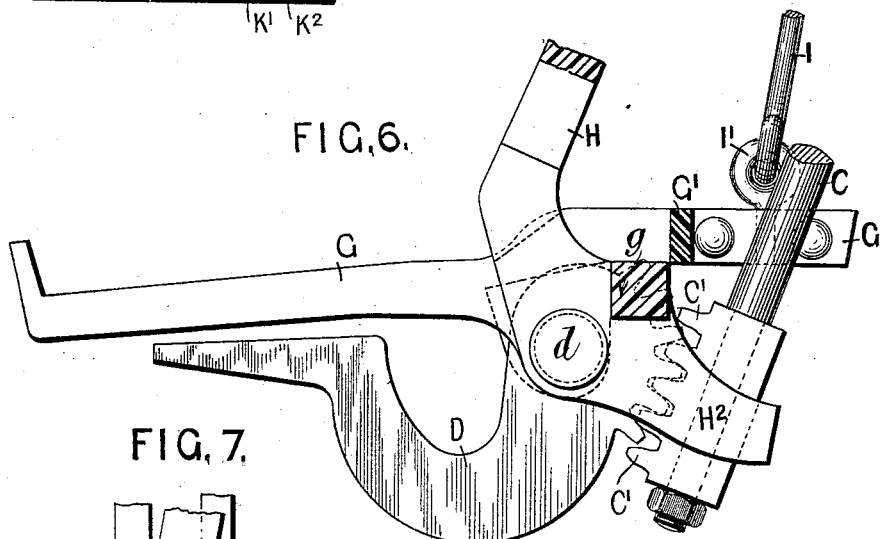
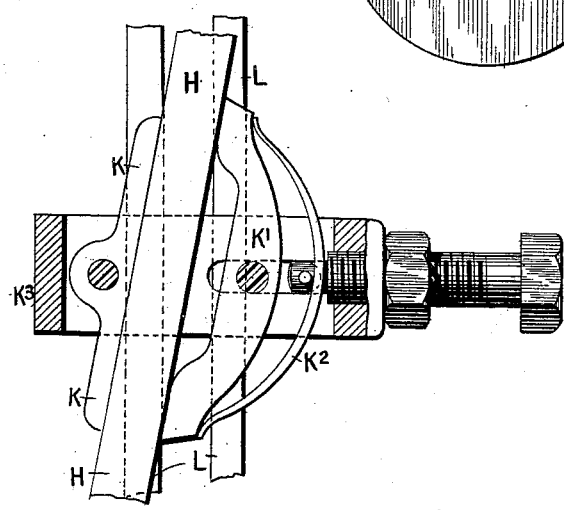
Witnesses:
Ella S. Johnson
B. W. Sommers
Inventors
Henry Francis Taylor
William Peddie Struve
pr Henry Orth Atty.

UNITED STATES PATENT OFFICE.

HENRY FRANCIS TAYLOR AND WILLIAM PEDDIE STRUVÉ, OF BRITON FERRY, ENGLAND.

APPARATUS FOR TINNING PLATES.

SPECIFICATION forming part of Letters Patent No. 453,304, dated June 2, 1891.

Application filed February 13, 1889. Serial No. 299,791. (No model.) Patented in England March 21, 1888, No. 4,350; in France March 15, 1889, No. 196,727; in Germany March 15, 1889, No. 50,149; in Spain May 14, 1889, No. 9,325; in Italy August 17, 1889, XXIII, 25,219, and in Austria-Hungary August 19, 1889, No. 12,050 and No. 40,273.

*To all whom it may concern:*

Be it known that we, HENRY FRANCIS TAYLOR and WILLIAM PEDDIE STRUVÉ, subjects of the Queen of Great Britain, residing at Briton Ferry, in Wales, have invented certain new and useful Improvements in Apparatus for Coating with Tin, Lead, or other Metals or Alloys, (for which we have obtained Letters Patent in the following countries: Great Britain, dated March 21, 1888, No. 4,350; France, dated March 15, 1889, No. 196,727; Spain, dated May 14, 1889, No. 9,325; Germany, dated March 15, 1889, No. 50,149; Austria-Hungary, dated August 19, 1889, No. 12,050 and No. 40,273, and Italy, dated August 17, 1889, No. 25,219, Vol. XXIII,) of which the following is a specification, reference being had to the accompanying drawings.

This invention applies to apparatus for coating and finishing plates, by preference, in one operation and in one pot, and in which are used a cradle and cradle guide or gate with nipping appliance for pulling down the plate to be coated, which is then brought over to the exit side and raised into the nip of the rolls on that side of the pot. Such apparatus is described in Patent No. 329,240, of October 27, 1885.

Now according to this our invention, and for the purpose of saving manual and skilled labor and for turning out much more and better work by such apparatus, we provide in connection with such apparatus certain appliances for mechanically operating the nipping appliance and the cradle or parts supporting the plate, so that when the plate has been put into the nipping appliance and cradle these shall be depressed and the plate released and canted and raised on the exit side, special means being provided for avoiding all possibility of buckling of the plate while rising up to the rolls on the exit side.

Figure 4:
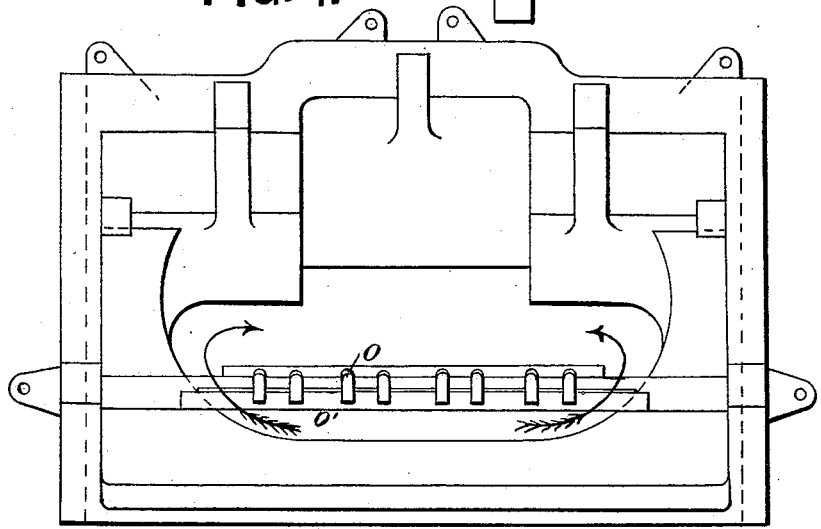

Figures 1 and 2 are vertical sections through the apparatus, showing the working parts in two different positions or stages. Fig. 3 is a plan. Fig. 4 is a plan of one form of pot, and Figs. 5 to 9 are detail views drawn to a larger scale.

To the face of the gear-wheel $A^4$ is secured a toothed sector $A^3$, for purposes hereinafter described, said gear-wheel being provided with segmental slots $a^4$, through which pass bolts $a^3$, by means of which and suitable nuts the said toothed sector is adjustably secured to the gear-wheel. We provide a crank-pin A, fixed to the wheel $A^4$, which is mounted to rotate freely on a pin fixed in a standard Q. This latter is made adjustable on its bed, as will be presently described. This crank-pin A or a cam or eccentric we rotate by tooth-wheel gearing $A^4$ $A^5$ or otherwise from the roll-driving shaft A', and by means of a connecting-rod $A^2$ we operate a lever B on a weigh-shaft B', which by another lever $B^2$ thereon communicates up-and-down motion to the nipper-rod C. The connecting-rod $A^2$ has holes—say four—as here shown, at the end where it connects to the lever B for the purpose of shortening or lengthening the connecting-rod $A^2$, as required, when the tooth-wheel $A^4$ has to be slid backward or forward with its supporting standard or bearing Q for the purpose of adapting the apparatus for working different depths of plates, the effective length of the connecting-rod $A^2$ and the parts worked thereby being varied accordingly. When this alteration of speed is to be done, we substitute a larger or smaller pinion for the pinion $A^5$. In order to facilitate this altering of pinion, we make it, by preference, in halves, so as to be readily removed and another substituted.

D is a nipper-hook that has its fulcrum $d$ in the lower forked end of the cradle-rod H, hereinafter referred to. The fulcrum of the nipper hook or finger D is arranged intermediately between the hook part proper and the moving rod C in order to give larger throw to the hook D and with uniform leverage. We operate it by means of rack C' on the rod C, gearing with a tooth-segment on the hook D, as shown enlarged in plan, Fig. 5, and sectional side view, Fig. 6.

Figure 5:
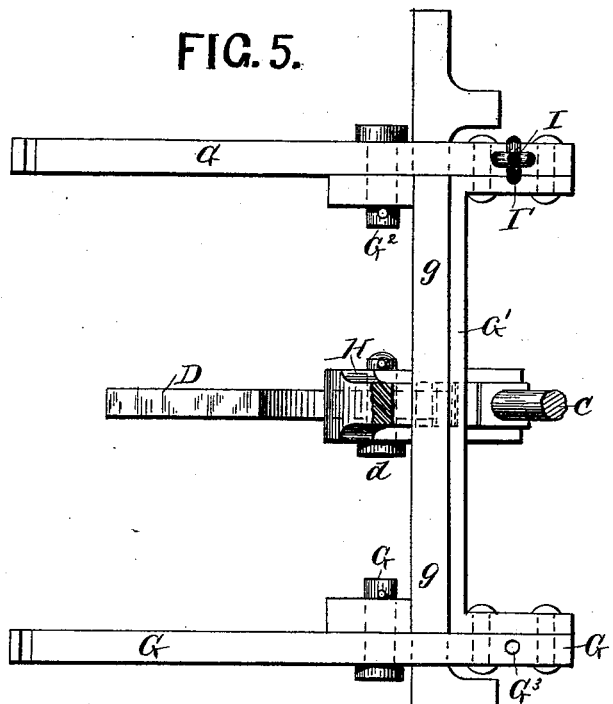

By means of tooth-wheel segment $A^3$ in connection with the roll-driving shaft A' and gearing with a tooth-rack E, that runs on guide-rollers E' E' and under a guide-pin $E^2$, all supported in suitable brackets, we operate the gate F for canting the plate over to the exit side. The rack E may be connected elastically with the gate F by means of the rod F', which is in two parts that are connected by a helical spring in a sleeve F², as shown in detail view, Fig. 9. Such an arrangement would be applicable in apparatus for coating very thin plates. A weight F³ or spring brings the gate F back, or we cant the gate by a pin or tappet from the crank-wheel A⁴, which pin in its rotation comes in contact with a lug on a sliding rod connected to the gate-lever, the weight F³ or a spring bringing the said rod and gate back. The yielding part G of the cradle, (see Figs. 5 and 6,) which supports the plates, is jointed to the other part. This jointed yielding part may be in the form of two levers G, mounted on fulcrum-pins G² and united by a cross-piece G', which levers in the rising of the cradle offer a certain resistance to the molten metal. The upward motion of the cradle on its fulcrum-pins G² is limited by a cross-bar g, as shown in Figs. 1, 5, and 6. Sometimes, therefore, as required to counteract the aforesaid resistance, we connect thereto a rod I, Figs. 1 and 2, which at its bottom end is hooked onto an eyebolt I', that is screwed into one of the holes G³ in levers G. (See Figs. 5 and 6.)

In order that the cradle-rod H may work at the required speed for all classes of plates (that is to say, according to the varying thickness and depth of plates) and be supplied with plates at the proper rate for the largest possible output of work, the plate would at a certain point be raised quicker than the rolls could take it; but the yielding appliance G G, regulated by the rod I, which may be weighted above the molten metal, as required, counteracts this, and thus prevents any hurt to the plate. The cradle-rod H and nipper-rod C may be held together by a staple or eye H², which also acts as a lateral guide for the rack C'. When the apparatus has been brought into the proper position, Fig. 1, the nipper hook or finger D being open ready to receive the plate, the latter is inserted. The rod H being held by a friction appliance or clamps K K', with drag-spring K², in a holder K³ on a vibrating link L or other support from the pot or framing, the first part of the downward stroke of the rod H, caused by the revolution of the crank A, will be to close the nipper-hook D, and thereby hold the inserted plate. This being done, the nipper-hook D cannot make any further movement around its fulcrum. The revolution of the wheel A⁴ still continuing, the rod H, with rod C and levers G, together with the plate, are carried down to the required depth. The link L has a slot at its upper end, and the clamp-holder K³ can be fixed in the notch 1, 2, or 3 on the link, according to larger or smaller depth of plate to be coated. The lever B² can similarly be connected to the nipper-rod C by one of the joint pin-holes 1, 2, or 3. Holes are similarly provided for adjustment at the end of the connecting-rod A². In the descent of the plate it is pulled down until the stepped part H' of the rod H meets the top part of the clamp K, whereupon the rod H is instantly released from its frictional contact with the clamp K and is free to drop when the nipper-finger D has released the plate. The plate having been thus pulled down far enough to pass under the exit grease-hopper M, the tooth-segment A² is now in gear with the rack E and the gate F is being canted over, as shown in Fig. 2. When the gate F has been fully canted, bringing the plate directly under the rolls, the horns F⁴ on two of the gate-bars F come under the bottom of the entrance flux-box R, and thus prevent the attendant from dropping a plate in behind the gate-bars F. The cradle is next lifted until the plate is put into the nip of the rolls N. The lever G at this stage dips so far as is necessary to prevent the buckling of the plate or indenting or curling up the bottom edge of same, owing to the speed of travel of the lever B' being at that point greater than the circumferential speed of the exit-rolls, for it is desirable and not merely for the sake of doing the greatest amount of work to cause the plates to follow each other as closely as possible without coming in actual contact, as thereby all the plates are evenly and equally coated, because the rolls are kept what is technically called properly "wet" or in good coating condition. The gate F has meanwhile been brought back and the upward movement is continued until the cradle is raised sufficiently into the position Fig. 1 ready to receive another plate.

T is a handle for throwing a clutch T' on the spindle A' in and out of gear with the pinion A⁵, and thus stop the motion of the pinion and of the wheel A⁴.

By the aforesaid improvements we not only decrease the number of attendants on such machines and produce coated plates of a more uniform character and quality of coating, but also render possible a greater rapidity and output of coated plates in a given time. There is, however, a limit as to speed, viz: the increased pressure against the side of the plate when it is quickly canted over, as the molten metal cannot escape sufficiently quickly laterally from between it and the inner front side of the coating-pot. In order, therefore, to remedy this, more particularly with reference to thin plates, as much as possible, we prefer to alter the form of the pot, and instead of the usual ribs with intermediate bays, in which the molten metal heretofore became inclosed more or less when the plate was canted toward the exit side, while part of it rushed off laterally, we use, as shown in Figs. 1 to 3, a grid o o', by preference of cast-iron. This grid is so formed and placed as to leave sufficient space between bars O and between them and the front P of the pot as to allow the molten metal to escape freely without much pressure or scour; also, as shown in the plan view, Fig. 4, of a pot, we round off the inner front corners in the part of the pot containing the molten metal, whereby we save weight of molten metal, while at the same time facilitating the easy flow of it in the direction of the arrows when the plate is canted back against the grid. By this form of pot we also render it less liable to crack by carelessly overheating or too sudden heating.

Having fully described our invention, what we desire to claim and secure by Letters Patent is—

1. A mechanically-operated plate-nipping, taking-down, canting, releasing, and lifting appliance consisting of a nipper-rod C, provided with a toothed rack at its lower end, a cradle-rod H, means for periodically raising and lowering the same, a nipper-hook D, provided with a toothed portion gearing with the toothed rack on rod C, said nipper-hook being pivoted to the lower end of said nipper-rod, friction-clamps for holding the rod H and at the proper point releasing the same, a gate F, means for canting the same, and a weight for bringing it back, said canting means and gate being independent of the moving parts within the pot, substantially as set forth.

2. A mechanically-operated plate-nipping, taking-down, canting, releasing, and lifting appliance consisting of a crank A, adapted to revolve continuously, a bell-crank lever B $B^2$, a connecting-rod $A^2$, pivotally connecting the arm B of the said lever with the crank A, the nipper-rod C, provided at its lower end with a toothed rack, the rod H, provided with a set-off H' at its upper end, the nipper-hook D, pivoted to rod H and provided with a toothed sector engaging with the toothed rack on rod C, the gate F, and the friction-clamps K K', between which extends rod H, in combination with the slotted link L, in the slot whereof friction-clamps K K' are adapted to slide, the toothed rack E, a connection between said toothed rack and the gate F, means, substantially such as described, for periodically moving the rack E in one direction, and a weight connected with said gate by cord and adapted to move the same in a reverse direction, as and for the purposes specified.

3. In a machine of the class described, means for canting the gate, which consist of the interchangeable gear $A^5$, a revoluble shaft, a crank A, and gear-wheel $A^4$, secured thereto, said shaft being adapted for adjustment to and from the gear-wheel $A^5$, and the toothed sector $A^3$, adjustably secured to wheel $A^4$, in combination with the rack-bar E, in gear with toothed sector $A^3$, and the gate F, connected with said rack-bar and adapted to move the said gate in one direction, and means, substantially such as described, for moving the gate in a reverse direction, for the purposes specified.

4. In a machine of the class described, means for canting the gate, which consist of the interchangeable gear $A^5$, a revoluble shaft, a crank A, and gear-wheel $A^4$, secured thereto, said shaft being adapted for adjustment to and from the gear-wheel $A^5$, and the toothed sector $A^3$, adjustably secured to wheel $A^4$, in combination with the bell-crank lever B $B^2$, a connecting-rod adjustably connecting the arm B of said lever with the revoluble crank, the rod C, carrying a cradle for supporting the plate to be coated and adjustably connected with arm $B^2$ of the lever, the rack-bar E, in gear with toothed sector $A^3$, the gate F, connected with said rack-bar and adapted to move the said gate in one direction, and means, substantially such as described, for moving the gate in a reverse direction, for the purposes specified.

5. The crank A, in combination with a bell-crank lever, the rod $A^2$, pivotally connecting the arm B of the bell-crank lever to crank A, the nipper rack-rod C, pivotally connected with arm $B^2$ of said lever, the cradle-rod H, provided with a set-off H' at its upper end, the nipper-hook D, pivotally connected with the lower end of rod H and in gear with the nipper rack-rod C, the friction-clamps K K', between which the upper end of rod H passes, the vibrating link L, provided with a slot in which the clamps K K' are adapted to slide, the yielding cradle G, and the weight-rod I, connected with said cradle, substantially as and for the purposes specified.

6. The combination, with the pivoted gate F and the toothed rack E for moving the said gate in one direction, of the two-part rod F' F', a resilient connection between the rod parts, and an encompassing sleeve $F^2$, substantially as and for the purposes specified.

7. The combination, with the gate F, the toothed rack E, and the supporting-pulleys E' E' for said rack, of the revoluble gear-wheel $A^4$, the toothed sector $A^3$ on said gear-wheel and adapted to periodically engage the rack E, the two-part rod F' F', connected with said gate and toothed rack, a resilient connection between the two parts of the rod, an encompassing sleeve for said resilient connection, and a weight connected by cord with gate E, substantially as and for the purposes specified.

8. The combination of the gate-bar levers F, one of which has a forked end and the others hook ends, the rack-bar E, a resilient connection between the rack-bar and the forked gate-bar lever, means for imparting motion to said rack-bar in one direction with the flux-box R, and a weight connected by cord with the rack-bar E for moving it in the opposite direction, substantially as and for the purposes specified.

9. The roll-shaft A' and the interchangeable pinion $A^5$ on said shaft, in combination with the gear-wheel $A^4$, the crank A, rigidly connected with said wheel, a bearing-bracket adapted to be adjusted laterally, and a gudgeon supported from said bracket and carrying the wheel $A^4$ and crank A, a bell-crank lever, a connecting-rod adjustably connecting the arm B of the lever with the crank, and the nipper-rod C, adjustably connected with the arm $B^2$ of said bell-crank lever and carrying a cradle for supporting the plate to be coated, substantially as and for the purposes specified.

10. A clamp K K', with drag-spring $K^2$, a rod H, held thereby and having a set-off H' for releasing it and jointed to a nipper-hook D, a rod C, having a rack which engages with a tooth-segment on the hook D, a holder $K^3$, inclosing the clamp K K', and a vibrating link L for supporting said holder and provided with a slot at its upper end for varying the position of the holder, substantially as and for the purposes specified.

11. The rod H, a nipper-hook D, jointed thereto, a rod C, gearing with said hook, clamping-pieces K and K' for holding the rod H and pivoted to a holder $K^3$, a drag-spring $K^2$, with screw for adjusting the clamping-pressure, and a vibrating link L for supporting the holder $K^3$, substantially as and for the purposes set forth.

HENRY FRANCIS TAYLOR.
WILLIAM PEDDIE STRUVÉ.

Witnesses:
 HENRY REES,
 JOHN GRIFFITHS,
Clerks to Mr. H. P. Charles, Solicitor, Neath.